Charles W. Skarstrom   Inventor

PRESSURE DEPENDENCE OF ADSORBERS

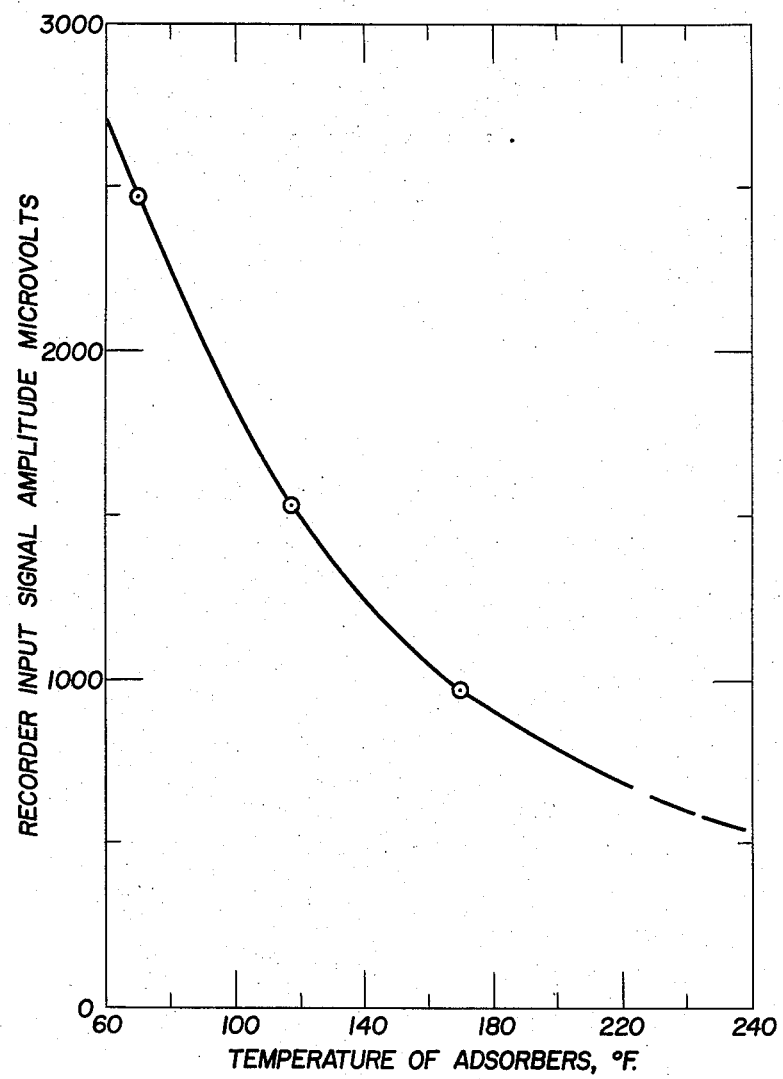

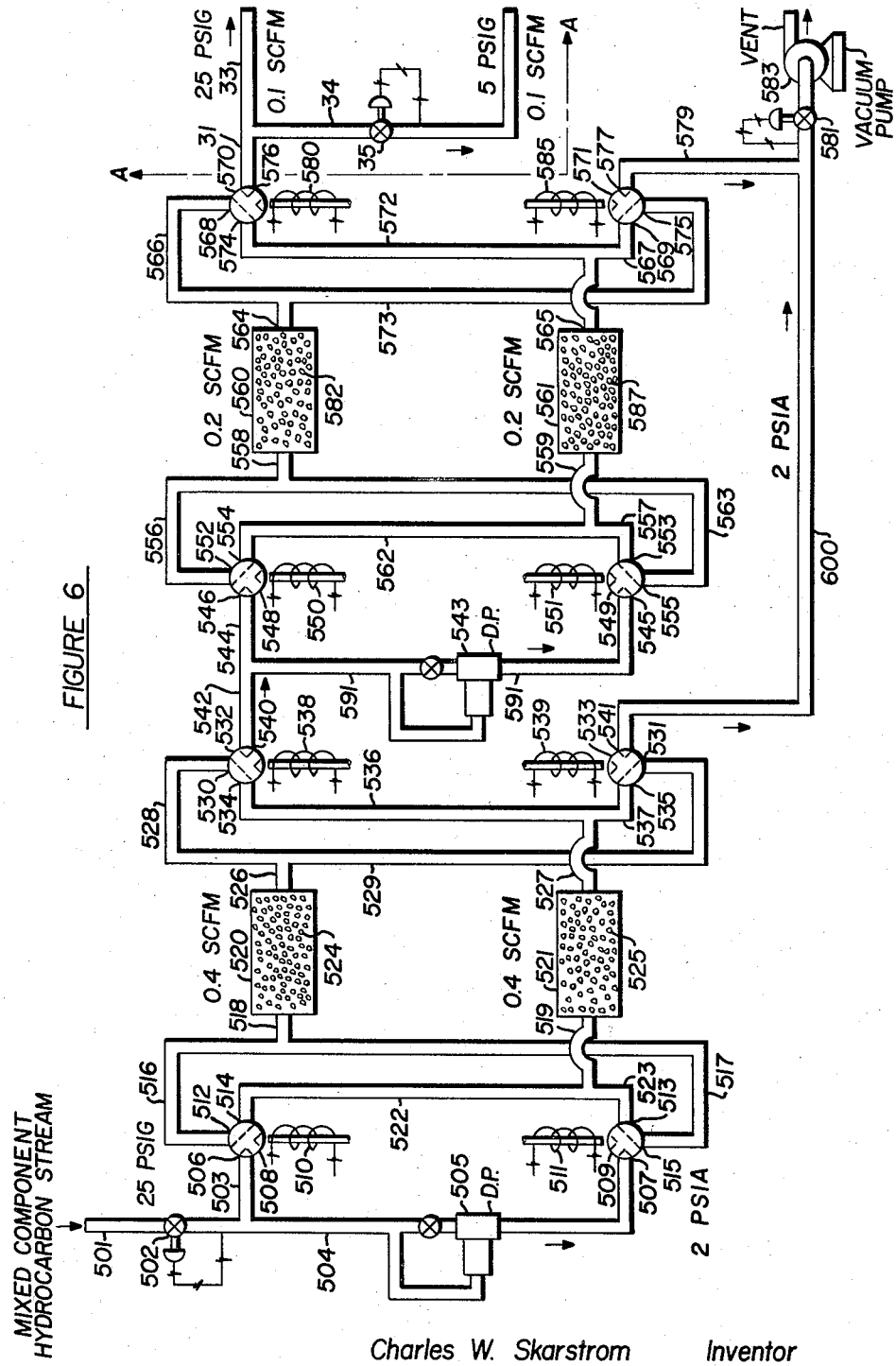

United States Patent Office 2,889,701
Patented June 9, 1959

2,889,701

APPARATUS FOR ANALYZING MIXTURES OF GASEOUS MATERIALS BY COMPOSITION MODULATION

Charles W. Skarstrom, Montvale, N.J., assignor to Esso Research and Engineering Company, a corporation of Delaware Application May 20, 1955, Serial No. 509,786

6 Claims. (Cl. 73—23)

The present invention relates to apparatus for analyzing mixtures of gases. More particularly the invention relates to apparatus for continuously determining the concentration of a key component of a mixture of gases in a flow stream. The invention is particularly adapted to such determinations when the key component may be present in the mixture in comparatively small amounts. The invention further relates to apparatus for accomplishing composition modulation of selected portions of a gas flow stream, wherein the concentration of the key component as supplied to a detector therefore is alternately increased and decreased to produce an oscillating signal, wherein the magnitude of the oscillation is proportional to the amount of the key component present in the initial flow stream.

In various industrial processes and manufacturing operations, it is frequently imperative to know the concentration of one or more components of a process gas stream, as well as to determine any variation in the concentration of such components. The term "key component" as employed in this application is used to designate the component or components to be determined. Specific examples of such key components might be water vapor as present in a refinery gas stream, isobutane as contained in a mixture of N-butane and iso- and N-pentane, or propane in air. Primarily the invention relates to the determination of one component of a binary mixture, but may be employed otherwise. As used in the following description of the invention the terms "gas" is intended to include not only those materials conventionally considered to be gases but also those materials conventionally considered to be vapors.

It is an object of the present invention to provide an apparatus for detecting the presence and concentration of a key component in a gas mixture sample stream, wherein the stream is passed to a detector for the key component through an adsorbent material having an affinity for the key component, while cyclically varying the pressure of the gas mixture within a predetermined range, whereby retention of the key component by the adsorbent is varied correspondingly, and whereby the concentration of the key component in the stream as supplied to the detector also is correspondingly varied, and the signal output of the detector is modified to produce a proportional signal amplitude fluctuation.

It is also an object of the present invention to provide a simple and rugged apparatus, whereby the desired determinations, usually requiring extremely delicate instrumentation, operating under closely controlled laboratory conditions, may now be accomplished under field conditions of operation and environment.

The invention and its objects may be more fully understood from the following specification when it is read in conjunction with the accompanying drawings, in which.

Figure 2:
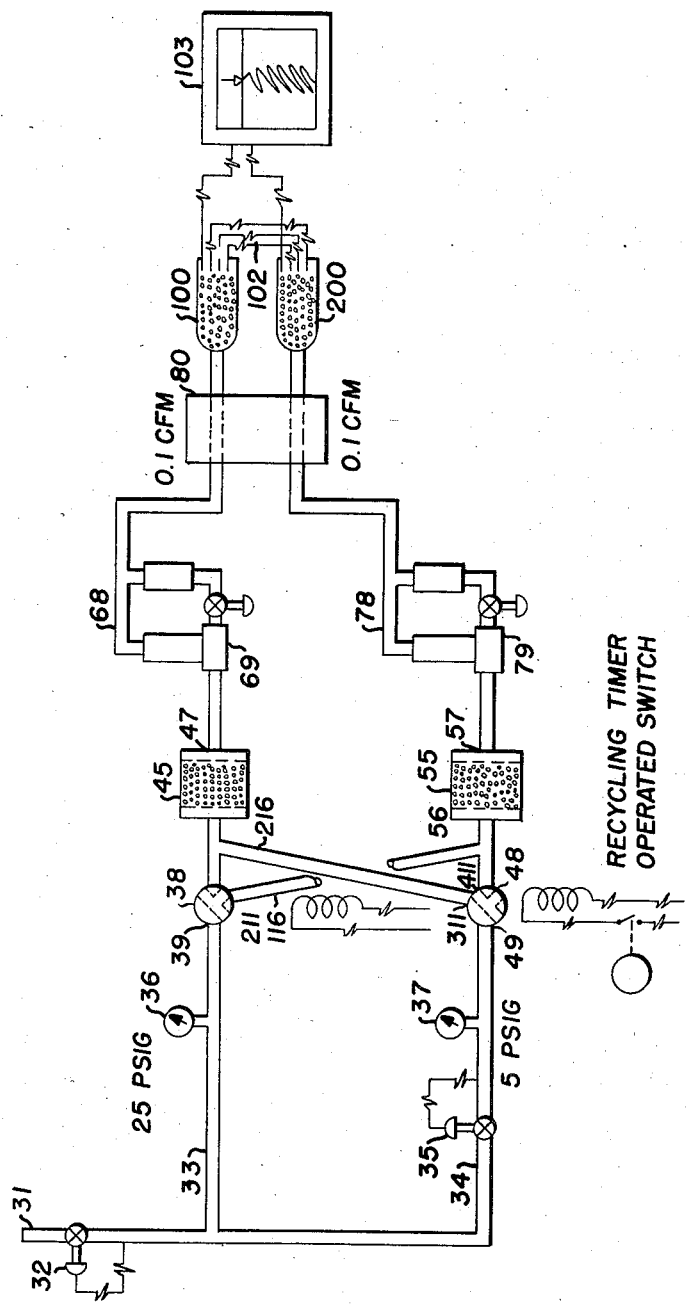
Fig. 2 is a similar illustration of a system particularly adapted for use with a detector substantially of the character illustrated in Fig. 1 of a copending application, Serial No. 306,993, filed August 29, 1952, now abandoned.
Figure 3:
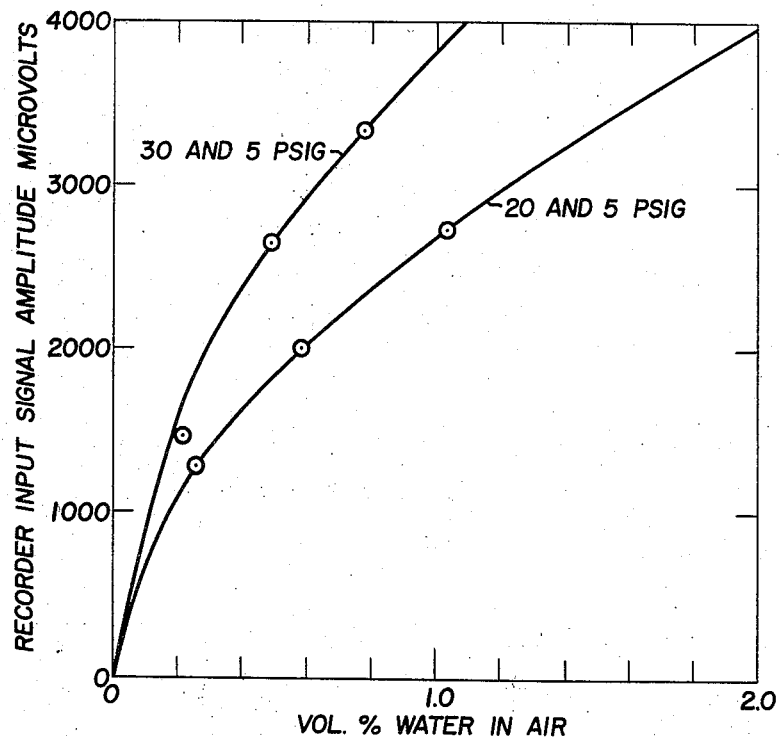
Figure 4:
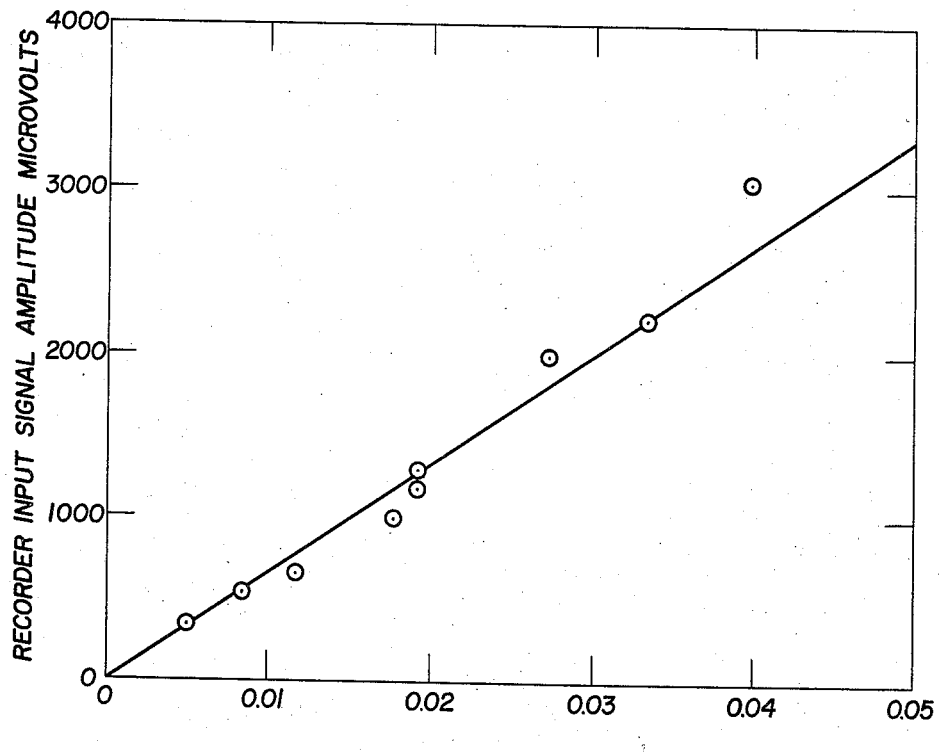

Fig. 3 graphically illustrates the calibration of the apparatus according to Fig. 2 wherein the gas mixture consisted of water vapor in air;

Fig. 4 illustrates graphically the effect on signal amplitude of changes in the range of pressure variation;

Fig. 5 illustrates graphically the effect of temperature variation on the amplitude of the signal produced while maintaining a given range of pressures on the gas flow stream; and Fig. 6 diagrammatically illustrates a system wherein a complex gas mixture is substantially reduced to a binary mixture for determination of a key component according to the present invention.

Figure 1:
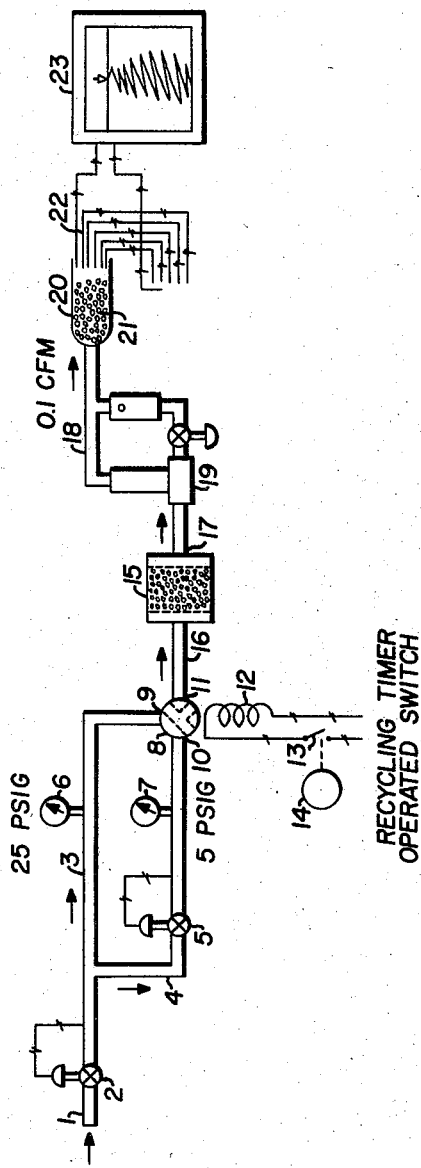
Fig. 1 is a diagrammatic illustration of the simplest form of the apparatus wherein the pressure on the sample gas flow stream is cyclically varied as it is passed continuously through an adsorbent for the key component.

Referring now in greater detail to the drawings, in Fig. 1, the numeral 1 designates a conduit for a gas flow stream. This flow stream may be the main stream, or a portion withdrawn from a main stream as a representative sample thereof. As shown, the conduit is provided with a pressure controller including a valve 2 whereby the pressure downstream from the valve 2 may be regulated to maintain the upper limit of pressure in the system. Connected to the conduit 1 are two branch conduits 3 and 4 of which the conduit 4 is provided with a second pressure control device including a valve 5 adapted to regulate the exit pressure in the line 4 so as to maintain a substantially constant pressure therein below that which exists in the branch line 3. Pressure recorder elements or gauges as indicated by the numerals 6 and 7 may be provided in the lines 3 and 4 respectively.

The numeral 8 designates a three-way valve having dual inlet connections 9 and 10 for the branch lines 3 and 4, respectively, and a single outlet 11. In order to provide for automatic operation of the system, the valve 8 may be motor driven, or otherwise operated electrically or by air pressure so as to alternate the connection through the valve between the outlet 11 and the inlets 9 and 10. In the form of the apparatus contemplated and as indicated in Fig. 1 the valve is actuated by a solenoid device designated by the numeral 12 and which is in turn actuated by a recycle switch 13 operated by means of a timer indicated by the numeral 14. The valve 8, solenoid device 12, timer switch 13 and timer 14 are all conventional in structure and operation, and are well known in the art. The sole requirement in this connection is to provide a valve having a function as described above and a suitable means for actuating the valve to perform its function in a regularly timed sequence. The outlet 11 is connected to a receiver or adsorber chamber 15 by way of a conduit connection 16 communicating with the outlet 11 at one end and at the other end opening into the receiver 15. The receiver 15 is adapted to contain any desired quantity of a material which will adsorb at least the key component of a gas flow stream supplied to the receiver by way of the preceding conduits and valves. The receiver 15 is in turn provided with an outlet 17, beyond the adsorber material contained by the receiver, communicating with a conduit 18 leading to any suitable device for detection of the key component in the gas flow stream as discharged from the adsorber chamber 15. In the apparatus as illustrated a suitable flow control mechanism indicated by the numeral 19 is included in the conduit 18 to maintain a certain constant flow through the conduit. As shown in Fig. 1 the device for detecting the key component, and designated by the numeral 20 therein, is such a device as is illustrated in Fig. 3 of a copending application, Serial No. 306,993, filed August 29, 1952, now abandoned, including an adsorption cell 20, an adsorbent material 21 therein tending to give off heat when adsorbing the key component and to abstract heat when the material is desorbed, a thermopile 22 to register temperature variations, and a recorder 23.

In operation of the system as illustrated by Fig. 1, the system is first calibrated by introducing a standardized reference gas stream through the conduit 1. In this stream the key component content has been established at a known and predetermined level, which may be a maximum or a minimum to be determined in an unknown stream. Alternately a series of such reference streams may be employed, to establish a series of indicated fixed reference points with which an unknown stream may be compared.

In this calibration procedure, a gas flow stream containing a known and predetermined amount of the key component to be determined is introduced by way of the conduit 1. In the conduit 1, and by means of the pressure control valve 2, the pressure of the incoming gas stream is established at some selected pressure limit which is the upper limit of the range of pressures to be employed. In the branch line 4, the pressure is further reduced to the lower limit of the pressure range to be employed, as by means of the controller 5. As a specific example of such a range of pressures, the pressure in the conduit 1 is established at 30 lbs. per square inch gauge and maintained substantially at this pressure in the branch line 3, while in the branch line 4 the pressure is reduced to about 5 lbs. per square inch gauge.

With the pressure range thus established, the valve 8 is operated, by adjustment of the solenoid actuating means and timer, to permit a flow of the gas stream to pass through the higher pressure line 3, inlet 9, and valve 8 to the outlet 11, and thence by way of conduit connection 16 through the adsorbent material contained in the receiver 15 to the outlet 17 thereof. In passing through the adsorbent material, the key component will be removed from the flow stream to a degree corresponding with the adsorption characteristic of the adsorbent material at the pressure of the gas, up to the capacity of the volume of the adsorbent material used, and as affected by temperature conditions in and around the apparatus. Thus at the outlet 17 the effluent gas flow stream temporarily will contain a substantially reduced proportion of the key component as compared with the stream as introduced into the adsorber 15 by way of the line 3 and inlet 9. The effluent gas stream from adsorber 15 then passes by way of the conduit 18 into the detector device 20 where an increase or decrease of the key component is detected and induces a signal which is registered by the recorder 23.

Flow through the branch line 3, valve 8, adsorber chamber 15 and the detector 20 is continued for such period of time as may be necessary for the adsorbent material in the chamber 15 substantially to reach an equilibrium. This equilibrium condition is, of course, not only dependent upon the nature of the adsorbent material but also upon the volume of such material in the chamber 15 and the ambient temperature. Although not shown in Fig. 1, it is contemplated that the ambient temperature of the adsorber shall be maintained substantially constant and preferably in the neighborhood of about 68–70° F. It is also contemplated that the ambient temperature may be controlled and maintained by means such as described in a copending application, Serial No. 445,991, filed July 27, 1954, now Patent No. 2,787,444. The equilibrium capacity for a key component of the adsorbing material may readily be determined for any condition of pressure or temperature.

Having determined the equilibrium capacity of the adsorbent under the condition of operation the timing device 14 is adjusted to provide a cycle such as to permit the adsorbent material substantially to reach the equilibrium condition and then to actuate the switching mechanism and thereby the solenoid device for actuating the valve 8 so as to switch the gas flow from the inlet 9 and the branch line 3 to the inlet 10 and branch line 4. When this occurs the gas flow stream is then introduced into the adsorber 15 at the lower pressure, and the equilibrium capacity of the adsorbent material is thereby reduced, causing the key component present on the adsorbent in excess of its equilibrium capacity at the lower pressure to be desorbed. The desorbed material enters into the stream of gas issuing from the outlet 17 of the adsorber. In effect then, this increases the volume and proportion of the key component in the flow stream passed through line 18 to the detector device 20 and causes a fluctuation in the signal transmitted to the recorder. Flow through the adsorber 15 from the low pressure line 4 is then continued for such predetermined period of time as will permit the adsorbent to attain its equilibrium capacity for the key component at the lower pressure. As previously indicated during this time the content of the key component in the stream issuing from the adsorbent outlet 17 and passed to the sensing device 20 will be increased. The increase will reach a peak and then gradually fall off to that point at which the adsorbent in the adsorber 15 reaches its capacity at the lower pressure. This capacity having been predetermined and the timing device adjusted thereto, the valve operating means 12 is then actuated to again switch the valve connection from the line 4 to the line 3, again passing the sample gas through the adsorber at the higher pressure, thereby increasing the capacity of the adsorbent material, and decreasing the quantity of the key component in the stream issuing from the adsorber 15 by way of the outlet 17. At this stage in the operation, the key component content of the stream supplied to the sensing device 20 will reach its lowest limit and likewise the sensing device will accordingly transmit a signal of lowest magnitude to the recorder 23. As the flow of the gas sample stream is switched back and forth between branch line 3 and branch line 4, the composition of the gas flow stream issuing from the adsorber will be modulated as to the key component in such fashion as to produce signals from the sensing device 20 which will have a substantially uniform fluctuation amplitude for the predetermined content of the key component in the reference stream.

Having thus determined the amplitude of signal fluctuation produced by a predetermined maximum or minimum content of the key component in the reference stream, when a stream of unknown key component content is substituted for the reference stream, under the same conditions of operation, the signal fluctuation produced may be related to that produced as a maximum or minimum by the reference stream. Likewise if the apparatus is calibrated by employing a series of reference streams of various predetermined key component content, the key component content may be referred to the series of readings obtained from the several reference streams. It is characteristic of the apparatus and the method of operation employed, that as the quantity of the key component in the sample flow stream increases the amplitude of the signal will increase also, and vice versa. As will be apparent the recorder 23 may be replaced or supplemented by suitable process control means for the purpose, and as desired to maintain any predetermined key component content in the sample stream.

Referring now to Fig. 2, in this figure there is illustrated a specific apparatus arrangement employed for determination of the water content in a compressed air line. In this operation two adsorbers are provided with interconnecting lines to two three-way flow switching valves and valve actuation means, and also with a pair of sensing cells for the effluent from the adsorbers. The apparatus as shown is substantially similar to that illustrated by Fig. 1 of the drawings in the application Serial No. 306,993, referred to above, now abandoned, and including heat exchanger means upstream from the sensing cells, here designated by the numeral 30. Referring to Fig. 2 in greater detail, a sample flow stream inlet conduit 31 is provided with a pressure control means including the valve indicated by the numeral 32, both corresponding to the elements 1 and 2 of Fig. 1. As indicated in the drawing, this pressure control means also is regulated by the downstream pressure. The conduit 31 is provided with branch conduits 33 and 34 which are the equivalents of the conduits 3 and 4 of Fig. 1. Also as in Fig. 1, the branched conduit 34 is provided with a pressure control means 35, and the conduits 33 and 34 are additionally provided with pressure gauges 36 and 37. As compared with the system illustrated in Fig. 1, however, two switching valve connections are provided wherein the branch conduit 33 connects to the inlet 39 of a switching valve 38 while the branch conduit 34 connects to the inlet 49 of a switching valve 48, each of valves 38 and 48 having a pair of outlets wherein the outlets of valve 38 are indicated by the numerals 111 and 211, and the outlets for the valve 48 are indicated by the numerals 311 and 411. The outlets 111 of valve 38 is connected to an adsorber 45 by means of a conduit connection 46 while the outlet 411 of the valve 48 is connected to an adsorber 55 as by means of the conduit connection 56. In addition, the outlet 211 of valve 38 is also connected to the line 56 as by means of a cross connection conduit 116 while the outlet 311 of the valve 48 is connected to the conduit connection 46 as by means of a cross connection 216. The adsorbers 45 and 55 are each provided with an outlet indicated in the drawing by the numerals 47 and 57, respectively, which communicate with the respective conduits 68 and 78 through suitable flow control means designated by the numerals 69 and 79 respectively. The conduits 68 and 78 in turn communicate with the respective sensing cells 100 and 200, connected by means of a common thermopile 102, to a recorder 103. A heat exchanger 80 serves constantly to maintain gas in the lines 68 and 78 at substantially the same temperature.

In operation of the apparatus illustrated by Fig. 2, the adsorbers are employed in phase opposition to modulate the water content of air from the compressed air line 31. The sensing cells 100 and 200 are adsorption type cells to detect the modulation in a push-pull arrangement in the two effluent streams issuing from the adsorber outlets 47 and 57 through the conduits 68 and 78. The adsorbers 45 and 55 are filled with cotton felt filter means each 1¼″ in diameter and ¼″ thick, while the two sensing cells 100 and 200 each contains 2 cc. of activated alumina. 20 pairs of iron constantan thermocouples, connected in series to form the thermopile 102, are employed to measure an oscillating temperature difference generated in the two sensing cells by the modulated flow produced by means of the adsorbers. A total cycle time of 4 minutes was employed. Each adsorber was held for two minutes at the high pressure and two minutes at the low pressure. Flow through each of the sensing cells was maintained at 0.1 cubic feet per minute by means of the flow control mechanisms indicated by the numerals 69 and 79.

In this operation air through the line 31 is passed simultaneously into the branch lines 33 and 34. From the line 33 the high pressure flow stream, at 30 lbs. per sq. inch gauge, passes through the line 46 from the outlet 111 into the adsorber 45. In the adsorber 45, at this pressure, the water is adsorbed to the equilibrium capacity of the adsorbent at that pressure. At the same time the pressure of the air flowing through the line 34 is reduced by means of the pressure reducing valve 35 to a pressure of 5 lbs. per square inch gauge entering the valve 48 by way of the inlet 49, the valve being disposed so as to communicate with the outlet 411 and the conduit connection 56 leading to the adsorber 55 wherein the adsorbent material will hold only so much of the water contained in the air stream as to reach an equilibrium capacity at the lower pressure. The operation may also be related to the partial pressure of the water vapor at the respective gauge pressures of the sample streams periodically supplied to each of the adsorbers 45 and 55 from the conduits 33 and 34 through valves 38 and 48 and the several conduits 46, 56, 116 and 216. At a gauge pressure of 5 p.s.i., the water vapor will have a partial pressure proportional to 20 lbs. per square inch absolute, while at a gauge pressure of 30 p.s.i., the water vapor will have a partial pressure proportional to 45 lbs. per square inch absolute. As the flow to each adsorber is periodically switched from the 5 pound stream in conduit 34 to the 30 pound stream in conduit 33, the adsorbent material in each adsorber 45 and 55 constantly seeks to come to equilibrium with the partial pressure of the water vapor in the streams at the respective gauge pressures, retaining more water vapor during the high pressure phase and releasing it during the low pressure phase. Thus the water content of the original stream is modulated so that the effluent stream contains less than the initial amount of water vapor during the high pressure phase and more than the initial amount of water vapor during the low pressure phase. The magnitude of the fluctuation depends upon the moisture content of the original stream.

As stated above, the detection means employed in the form of the invention as illustrated by Fig. 2 corresponds to that which has been disclosed with reference to Fig. 1 of the copending U.S. patent application, Serial No. 306,993, now abandoned. In its present combination with the composition modulating apparatus now disclosed, during the cycle in which water vapor is adsorbed from the entering sample gas flow stream at a pressure of 30 lbs. per square inch gauge the flow to one of the two detector cells shown in Fig. 2 of the drawings in this application will be substantially analogous to the "dry" air stream mentioned in the prior application. Likewise in the present application that portion of the sample gas flow stream which is handled at the lower pressure of 5 lbs. per square inch gauge will be substantially analogous to the moist air stream referred to in the prior application, and especially during that stage of the corresponding cycle in which water vapor previously adsorbed at the higher pressure is being desorbed. As may be determined from the switching cycle described above, the flow stream through both the conduits 68 and 78 to the respective detector cells alternate between a comparatively moist condition and a comparatively dry condition thus producing from the cells an alternating sequence of signals. The alternation of these signals in turn, as sensed and transmitted by the thermo couple connections indicated by the number 22, will result in a fluctuation of the signal recorded by a suitable instrument, such as designated by the numeral 23 in the present drawings, or transmitted to a control instrument, not shown.

The apparatus as described with reference to Fig. 2, may be calibrated in substantially the manner described with reference to Fig. 1. Where reference is required to only a single value for the key component, a stream containing the key component in the desired predetermined amount is introduced by way of the conduit 31. By operation of the apparatus of Fig. 2, in the manner described above, a certain magnitude of fluctuation will be produced in the signal obtained in the sensing cells 100 or their equivalent. The magnitude of this fluctuation will provide a basis for comparison with the magnitude of fluctuation produced by an unknown content of the key component in a stream subsequently passed through the system. By increasing and decreasing the key component content of the calibration stream in predetermined increments, it is possible to establish a progressive series of reference values over any desired range. Further, these values may be directly integrated with certain values established for the control of process operations in such manner as to provide for automatic control of process variables tending to produce the determined variation of key component content in a process stream.

Referring now to Fig. 3 the graph provided indicates the amplitude fluctuation of the signal output by a sensing device such as shown in Fig. 2. Modulation was accomplished by the use of two adsorption zones such as 45 and 55 of Fig. 2 each containing a disc of cotton felt one and one-quarter inches in diameter and one-quarter inch thick, and two sensing cells each containing 2 cc. of activated alumina, and twenty pairs of iron-constantan couples. The temperature of the adsorption zones was at 70° F. with pressures varied as shown on the graph, while the sensing cells were operated at atmospheric pressure and a temperature of 122° F. Flow through the sensing cells was maintained at 0.1 cubic foot per minute. The switching cycle had a total duration of four minutes, with a two minute period being allotted to each pressure phase. As will be noted from the graph, in the pressure range of from 5 to 30 lbs. per square inch gauge, 0.2 volume percent water in air provided a signal amplitude of about 1500 micro volts while 1.0 volume percent water in air produced a fluctuation in signal amplitude of slightly less than 4,000 micro volts. Also demonstrated by the graph is the fact that the fluctuation amplitude tends to increase as the pressure differential is increased. As may be noted the difference in amplitude between a pressure of 30 lbs. and a pressure of 20 lbs. produces an increase in amplitude of the signal of slightly more than 1,000 micro volts for substantially the same 1.0 volume percent of water in the sample gas flow stream. Within limits therefor when using a higher differential between the upper and lower limits of the pressure cycle the determination of small percentages of variation in the content of a key component in the sample gas flow stream may be facilitated due to the increased range or amplitude of the tracing made by a recording instrument of the character contemplated.

The effect on signal amplitude of changes in the range of pressure variation is shown graphically in Fig. 4. Fig. 4 also demonstrates a correlation with the following pressure function:

$$\left(\frac{1}{P_1}\right) \text{ minus } \left(\frac{P_1}{P_2^2}\right)$$

where $P_2$ is the high pressure, expressed as absolute pressure, and $P_1$ is the low pressure, expressed as abolute pressure. In the graph these pressures are represented along the axis of abscissas as the reciprocals of their functions.

The data providing the basis for the graph of Fig. 4 were obtained from the analysis of air containing 0.7 volume percent of water vapor at 70° F. with different pairs of pressures as represented by the reciprocals noted.

As previously indicated ambient temperatures may significantly vary the capacity of the adsorbent materials contemplated for employment according to the present invention. Fig. 5 graphically illustrates the effect of temperature on the amplitude of a signal produced while the adsorbers are operated over a specific range of pressures. The data represented by the graph were obtained during a composition modulation operation wherein the higher pressure ($P_2$) was 20 pounds per square inch gauge and the lower pressure ($P_1$) was 5 lbs. per square inch gauge, and while employing an apparatus and operating technique substantially as described with reference to Figs. 2 and 3.

In Fig. 6 there is illustrated a composition modulation system adapted to reduce a complex mixture of components, including heavy and light components to a simpler mixture wherein the key component is included among the lighter components. The apparatus as shown may also be employed to reduce a complex mixture of adsorbable gaseous components to a binary mixture including a key component for which a final determination is to be made. The apparatus as illustrated by Fig. 6 is intended for connection into a composition modulation and detection system such as has been described with reference to either of Figs. 1 and 2, and in Fig. 6, such a connection is indicated to the right and above the right angular dotted lines A—A. In the drawing connection to the apparatus of Fig. 2 is indicated, beginning with the conduit 31 thereof, beyond the pressure controller 32 of that figure, and also including a showing of the branch conduits 33 and 34 and pressure controller 35 of Fig. 2.

To the left and below the right angular dotted lines A—A of Fig. 6 is included diagrammatic illustration of a composititon modulation system as it may be employed for the purpose of reducing a complex mixture of gaseous materials to a binary mixture for the purpose of determining the content of a key component in the original mixture. The mixture contemplated in this instance is a refinery residue stream substantially comprising 10% isobutane, 85% n-butane and 5% iso and n-pentane. In this mixture the isobutane is the key component for the purpose of analysis. Composition modulation is here employed as a separation technique in order to remove the heavier $C_5$ components including the iso and n-pentane fractions leaving a binary mixture of the $C_4$ components including isobutane and n-butane.

In Fig. 6 the numeral 501 designates a conduit for introducing the complex gas mixture into the system and including a pressure control valve 502 regulated by the downstream pressure to maintain a pressure in the system of about 25 lbs. per square inch gauge. The conduit 501 connects with two branch lines 503 and 504 respectively. In the branch line 504 is a differential pressure flow controller 505. Each of the branch lines 503 and 504 is connected to the inlets 506 and 507 of three-way valves 508 and 509 respectively. The valves 508 and 509 are mechanically operated as by means of timed switching devices 510 and 511 respectively which are adapted to alternate flow through the respective valves as from the inlet 506 of valve 508 alternately to the outlets 512 and 514 therefrom and from the inlet 507 of valve 509 to the outlets 513 and 515 thereof. The outlet 512 of valve 508 is provided with a conduit connection 516 communicating with an inlet conduit 518 to an adsorber 520, and also with a conduit connection 522 communicating between the outlet 514 and an inlet conduit 519 to a second adsorber 521. The outlet 515 of valve 509 is provided with a conduit connection 517 which also opens into the inlet conduit 518. This valve 509 is further provided with a conduit connection 523 which, with the conduit connection 522 from valve 508, also communicates with the inlet conduit 519 to the adsorber 521. Each of the adsorbers 520 and 521 is adapted to contain a packing of an adsorbent material as indicated by the numerals 524 and 525 respectively. The apparatus as thus far described constitutes a first stage of composition modulation according to the present invention.

Following the adsorbers 524 and 525 outlet conduits 526 and 527 communicate between the respective adsorbers and conduit connections made to a second series of three-way valves. As shown in the drawing the outlet conduit 526 communicates with a conduit 528 connected to one inlet 530 of a three-way valve 532. At the same time the conduit 526 communicates with one inlet 531 of a three-way valve 533 by way of the conduit connection 529. In similar fashion the outlet conduit 527 from the adsorber 525 communicates with the other inlet 535 of the valve 533 by way of the conduit connection 537. At the same time the outlet conduit 527 is in communication with the other inlet 534 of the valve 532 by way of a conduit connection 536. Each of the valves 532 and 533 is operated as by means of timed switching mechanisms 538 and 539 alternately to provide connection between each of the inlets to the respective valves and the outlets of the valves designated by the numerals 540 and 541. In such operation the sequence is so arranged that while the outlet conduit 526 is connected to the outlet 540 of valve 532 by way of the conduit 528 and the inlet 530, the outlet conduit 527 is connected to the outlet 541 of valve 533 by way of the conduit 537 and inlet 535, while at the same time the inlet 518 of the adsorber 520 is connected to the conduit 503 through the inlet 506 of valve 508, outlet 512 thereof and the conduit connection 516, while the inlet 519 of the adsorber 521 is connected to the conduit 504 by way of the inlet 507 of valve 509, outlet 513 thereof and the conduit connection 523. The timing and switching mechanisms designated by the numerals 510, 538, 511 and 539 are so related in the system as thus far described as to alternate flow from the line 503 and the line 504 through the valves 508 and 509, adsorbers 520 and 521 while at the same time alternating the position of the valves 532 and 533 to permit alternation from the adsorbers 520 and 521 through these valves to the outlets 540 and 541.

The outlet 540 of the valve 532 communicates with a conduit 542. This conduit in turn is divided into two branch conduit connections 544 and 591, the branch conduit 591 including a differential pressure controller 543. The branch conduit 544 communicates with the inlet 546 of a three-way valve 548, while the branch conduit 591 communicates with the inlet 545 of a three-way valve 549, each of the valves 548 and 549 being provided with synchronizing switching mechanisms 550 and 551. Each of the valves 548 and 549 is also provided with dual outlets 552 and 554 for valve 548, and outlets 553 and 555 for valve 549. Of these outlets, outlet 552 is connected, by means of a conduit 556, to an inlet conduit 558 communicating with an adsorber 560, while the outlet 553 of valve 549 is connected, as by conduit 557, to an inlet conduit 559 communicating with an adsorber 561. The other outlet 554 of the valve 548 is connected by means of a conduit connection 562 to the inlet conduit 559 of adsorber 561, while the other outlet 555 of valve 549 is connected to the inlet conduit 558 of adsorber 560 by means of a conduit connection 563.

Each of the adsorbers 560 and 561 is provided with an outlet conduit 564 and 565 respectively. The outlet conduit 564 communicates by way of a conduit connection 566 with one inlet 568 of a three-way valve 570, while the outlet conduit 565 of the adsorber 561 communicates by way of conduit connection 567 with one inlet 569 of a three-way valve 571.

The outlet conduit 564 also communicates by way of a conduit connection 573 with the other inlet 575 of the valve 571, while the outlet connection 565 communicates by way of a conduit connection 572 with the other inlet 574 of the valve 570. Each of the valves 570 and 571 is also provided with an outlet 576 and 577 respectively.

In order to vent the undesired portion of the initial gas flow stream from this portion of the system a conduit 600 is provided. This conduit at its downstream end is connected to the outlet 541 of the valve 543. At the same time a branch conduit connection 579 is provided to the outlet 577 of the valve 571. Included in the conduit 600, downstream from the connection of branch conduit 579 therewith, is a pressure regulator valve 581 controlled by pressure in the line 600 upstream from the valve. A vacuum pump 583 is also provided in the conduit 600 downstream from the pressure regulator valve 581.

The valves 570 and 571 are also provided with time switching mechanisms, similar to those previously described, and here indicated by the numerals 580 and 585. The operation of these mechanisms is synchronized one with the other, and also with the other corresponding switching mechanisms previously described. In the adsorbers 560 and 561 the adsorbent material employed is indicated by the numerals 582 and 587. As previously indicated the outlet 576 of the valve 570 is provided for connection into a system for further composition modulation of that portion of the gas flow stream containing the key component. In Fig. 6 this connection is indicated to be to the line 31 of the apparatus as illustrated in Fig. 2. This connection, however, could be made to the conduit 1 of the apparatus illustrated in Fig. 1 and some of invention retained.

In operation of the system as illustrated in Fig. 6 a complex mixture of hydrocarbon gases containing isobutane, n-butane and iso and n-pentane wherein isobutane is the key component would be introduced by way of the conduit 501. A portion of this gas would then be passed by way of the conduit 503 through the valve 508 and the outlet 512 to the adsorber 520. Simultaneously another portion of the gas stream entering through the conduit 501 would be passed by way of the branch conduit 504 through the inlet 507 of the valve 509, to emerge therefrom at the outlet 513 thence passing by way of the conduits 523 and 519 into the adsorber 521. The pressure on the gas passed to the adsorber 520 is maintained at substantially 25 lbs. per square inch gauge, while the pressure of the gas passed to the adsorber 521 is reduced, as by the differential pressure controller 505, to about 2 lbs. per square inch absolute. The flow rate through both adsorbers is maintained at about 0.4 standard cubic foot per minute. At the pressure of 25 lbs. per square inch a substantial portion of the $C_5$ components of the stream are adsorbed and retained by the adsorbent in the adsorber 520. The remaining portion of the stream then passes through the three-way valve 532 by way of the outlet 526 conduit connection 528, inlet 530 and outlet 540 into the conduit 542. At the pressure of 2 lbs. per square inch absolute which is maintained, during this cycle, on the adsorber 521, substantially none of the $C_5$ hydrocarbons are retained on the adsorbent material 525 therein. Substantially the entire gas flow stream passes through the adsorber and thence by way of the outlet 527, conduit 537, inlet 535 of valve 533 to the outlet 541 thereof and thence is vented by way of the conduit 600. The pressure regulator valve 581 and the vacuum pump 583 cooperating with the differential pressure flow control 505 to maintain the pressure in the adsorbent and connecting lines at substantially the pressure of 2 lbs. per square inch absolute. The gas flow stream portion passed into the conduit 542 is then divided again into a first portion which passes by way of the conduit 544, inlet 546, of valve 548, to the outlet 552 thereof and thence by way of the conduit connection 556 into the adsorber 560 through its inlet 558. Simultaneously another portion of the gas flow stream in conduit 542 passes through the branch line 591 and three-way valve 549 to emerge therefrom by way of the outlet 553 whence it is introduced into the adsorber 561 by way of the conduit 557 and adsorber inlet 559. Pressure on the adsorber 560 continues to be maintained at substantially 25 lbs. per square inch gauge while the pressure on the adsorber 561 continues to be maintained at substantially 2 lbs. per square inch absolute. The flow rate through these two adsorbers 560 and 561 is reduced as compared with that through the adsorbers 520 and 521 to a rate of substantially 0.2 standard cubic feet per minute. At these pressures and flow rate substantially all of the $C_5$ hydrocarbons remaining in the gas flow stream, entering by way of conduit 558, are removed in the adsorber 560 while the stream passed through the adsorber 561 from conduit 557 is discharged at the outlet 565, passing therefrom by way of the conduit 567 and inlet 569 of the three-way valve 571 to the outlet 577 thereof whence it is discharged into the vent line 600 by way of the conduit connection 579. The stream of gas which issues from the adsorber 560 by way of the outlet 564 thereof is now substantially free of $C_5$ hydrocarbons and substantially constitutes a binary mixture of $C_4$ hydrocarbons including the key component isobutane. This stream now passes by way of the conduit 566 and inlet 568 of the three-way valve 570, to the outlet 576 whence it is discharged into the conduit 31 shown in the drawing.

Preferably the adsorbent material as indicated by the numerals 524, 525, 582 and 587 in the apparatus illustrated in Fig. 6 is a material having a high adsorbency for $C_5$ hydrocarbons at the temperature and higher pressure employed in initiating the operation of that portion of the system illustrated by Fig. 6. The timing mechanisms are adjusted to a time cycle which permits the adsorbent material to reach its equilibrium capacity at the respective pressures employed. In this adjustment the time required for the adsorbent material to reach its equilibrium capacity at the higher pressure determines the cycle period inasmuch as at the lower pressure the cycle period inasmuch as at the lower pressure the $C_5$ hydrocarbons are rapidly desorbed and vented from the system.

The time cycle having been determined and set the flow through the line 503 to the inlet 506 of valve 508 is now switched to the outlet 514 thereof, thence passing by way of the conduit connections 522 and the inlet 519 into the adsorber 521, while simultaneously the flow of gas through the branch conduit 504 and three-way valve 509 is switched from the outlet 513 thereof to the outlet 515 thereof, whence it passes by way of the conduit connection 517 and the inlet 518 into the adsorber 520. At the same time the switching mechanisms 538, 539, 550, 551, 580 and 585 simultaneously act to alternate the flow from the initial outlet of each three-way valve, with which these switching mechanisms are respectively connected, so as to direct the flow of the respective gas flow stream portions into and through the opposite number of each of the remaining adsorbers. Thus, the low pressure stream portion now passes through each of the adsorbers 520 and 560, which initially received the high pressure stream, while the high pressure gas flow stream portion, initially passed through the adsorbers 520 and 560, now passes through the adsorbers 521 and 561, which initially received the low pressure stream portion. Thus by alternating pressure on the adsorbers according to a predetermined cycle the composition of the gas flow stream which issues from any one of the adsorbers is modulated so as alternately to reduce and alternately to increase the amount of $C_5$ hydrocarbons in the stream of gas which issues from each adsorber. Also by virtue of the synchronized and coordinated action of the three-way valves following each pair of adsorbers that portion of the gas flow stream which has been modulated by re-introduction of the $C_5$ hydrocarbons, removed from the initial stream at the higher pressure, is passed directly into the vent conduit 600 for discharge from the system while that portion of the gas flow stream whch has been modulated by the removal of the $C_5$ hydrocarbons is maintained at the higher pressure through the system and eventually passes into the inlet of the adjoining portion of the system, beyond the dotted lines $a$—$a$, wherein the key component content of the stream is to be determined.

Although the handling of complex gas mixtures has been more or less specifically described with reference to a mixture of $C_4$ and $C_5$ and hydrocarbons wherein isobutane is the key component, similar operations may be conducted with complex mixtures such as a $C_4$ hydrocarbon residue stream wherein benzene may be present as the key component in amounts from 0 to 10%. Also the system and method may be applied to a gas stream including liquefiable petroleum gases wherein iso and n-butane are present in amounts of from 0 to 4%, or to a gas flow stream such as the hydrocarbon feed to an alcohol plant wherein $C_4$ hydrocarbons, present in quantities from 0 to 5%, are the key components in a mixture with $C_3$ hydrocarbons. The system and method will also be found useful where employed in conjunction with a suitable alarm system in order to avoid dangerous concentrations of flammable or explosive gaseous materials in air, as for example, propane in air. By sampling the ambient atmosphere in any suitable fashion, the dangerous key component may be determined, and when the concentration of this key component in the atmosphere exceeds certain predetermined limits, a sensing device, such as herein described, may be employed to actuate suitable ventilating or other means to reduce the dangerous concentration thereof in the atmosphere sampled.

As has been previously stated the selection of adsorbent materials employed, and operating pressures and temperatures will be gauged to obtain a maximum adsorption of the key component in any given operation. For example, the cotton felt material suitable for composition modulation of an air stream, where water is the key component, is efficient for this purpose but such a material is not satisfactory where propane is the key component in an air stream. For the latter purpose activated alumina is preferred. Likewise in the composition modulation of a stream of a material which is liquid at ordinary atmospheric temperatures it may be necessary to maintain the adsorbers at a temperature high enough to keep the material in a gas phase. This circumstance is illustrated by operation wherein the key component is from 0 to 2% water in isopropanol. Likewise where it is desired to determine from 0 to 2% secondary butyl alcohol in methyl ethyl ketone, an adsorbent material such as silica gel or activated alumina would be most efficient under the temperature conditions required to maintain the sample stream in the gas phase.

The use of detector or sensing apparatus which is responsive to changes of temperature in the adsorbent material such as the sensing devices illustrated and described with reference to Figs. 1 and 2 provides a convenient way for the detection of the key component in a given stream, but the present invention is not to be considered as limited to the use of such detection means. The use of both dispersion and non-dispersion infrared and ultraviolet analyzers is also contemplated where a high degree of selectivity to the key component is desired. Thermal conductivity analyzers may also be employed. Likewise where the sample gas stream or carrier gas is highly complex as where analyzing for benzene in a $C_4$ hydrocarbon residue stream, an ultra violet spectrometer can be used to advantage as a selective detector for the benzene component. The use of an optical detector is greatly simplified by composition modulation of the key component in the sample stream.

Further, while the method and apparatus has been set forth with reference to employment of a recorder mechanism for exhibiting signals developed by such means as the sensing device described in connection with the forms of the apparatus as illustrated in Figs. 1 and 2, as has been indicated, these signals may also be exhibited through the media of process control actuating means including motorized valves, and other automatic, air or electrically operated controls.

What is claimed is:

1. An apparatus for composition modulation of a gaseous fluid-flow stream and for determination of the content of a key component in said stream which comprises a conduit providing a flow path for said gaseous stream, an adsorber chamber included in said conduit, means for cyclically and alternately varying the pressure on said flow stream as introduced into said adsorber chamber, means for maintaining substantially constant temperatures in said flow stream prior and subsequent to passage through said chamber, and a means for measuring and exhibiting the content of said key component in said flow stream subsequent to passage through said adsorber.

2. An apparatus according to claim 1 wherein said means for cyclically and alternately varying the pressure on said flow stream as introduced into said adsorber chamber, comprises first and second conduit branch portions each having an outlet, a three way valve communicating with each of said branch portion outlets and with said conduit downstream from said branch portions, means for inducing a differential between the pressure on said gaseous flow stream in each of said branch portions, and means for cyclically actuating said valve means alternately to establish communication between said branch portions and said conduit downstream therefrom.

3. An apparatus for composition modulation of a gaseous mixture in a fluid-flow stream thereof, comprising a conduit system adapted to convey said stream; an adsorber chamber defined in said conduit system, said chamber having an inlet and an outlet and being adapted to contain a body of material adsorptive for a key component of said mixture; means in said conduit system, upstream from said adsorption chamber inlet, for cyclically and alternately varying the pressure on said flow stream between selected upper and lower pressure limits, whereby the content of said key component in said stream at said adsorber chamber outlet is decreased by adsorption in said chamber during said upper pressure cycle and increased by desorption in said chamber during said lower pressure cycle; and means for maintaining said flow stream at a substantially constant temperature in said conduit system upstream from said adsorber chamber.

4. An apparatus for cyclically modulating the content of a key component in a flow stream of a gaseous mixture, comprising a conduit system adapted to convey said stream of said gaseous mixture; an adsorber chamber defined in said system, said chamber adapted to contain a body of a material adsorptive from said key component, said chamber having an inlet and a discharge outlet; a pair of branch conduit portions in said conduit system upstream from said adsorption chamber inlet; valve means in said conduit system adapted to place said adsorber chamber inlet in exclusive communication with each of said branch conduit portions, in cyclic, alternate sequence; pressure control means in said conduit system, upstream from said branch conduit portions, adapted to produce a selected initial pressure on said flow stream; pressure control means in one of said branch conduit portions adapted to produce a selected reduced pressure on said flow stream downstream from said control means; means for actuating said valve means in a timed sequence, and for a cycle period at each said initial and reduced pressures required for said adsorbent material substantially to reach an equilibrium capacity for said key component at each said pressures; whereby the content of said key component in said stream at said adsorber chamber outlet is decreased by adsorption by said adsorbent material at said initial pressure and increased by desorption from said adsorbent material at said reduced pressure; and means for maintaining a substantially constant temperature in said gas mixture flow stream upstream from said adsorber chamber.

5. An apparatus for composition modulation of a gaseous mixture in a flow-stream thereof, comprising a conduit system adapted to convey said flow-stream, said conduit system including a manifold inlet portion and first and second branch portions communicating with said inlet portion; first and second adsorber chambers defined respectively in said first and second conduit system branch portions, each said chamber having an inlet and an outlet and adapted to contain a body of a material adsorptive for a key component of said gaseous mixture intermediate the inlet and outlet of each said chamber; means in said conduit system manifold inlet portion adapted to produce a substantially constant and selected initial pressure in said stream; means in said second branch portion adapted to produce a substantially constant and selected reduced pressure in a stream portion downstream from said means; valve means in each of said first and second conduit system branch portions, each having an inlet port in open communication with one of said branch portions upstream from the adsorber chamber defined therein, a first outlet port connected for communication with said adsorber chamber, and a second outlet port; a pair of conduit cross connections each connected at one end for communication with said second outlet port of the valve means in one of said branch portions and in open communication at the other end with the inlet of the adsorber chamber defined in the other of said branch portions; means adapted synchronously to actuate each of said valve means repetitively and alternately to connect each branch portion with each adsorber chamber for a cycle period substantially equal in time to that required for said adsorbent material therein to reach an equilibrium capacity for said key component at each of said initial and reduced pressures; whereby the content of said key component in the stream discharged at each adsorber chamber outlet is decreased by adsorption by said adsorbent material at said initial pressure and increased by desorption from said adsorbent material at said reduced pressure; and means for maintaining a substantially constant temperature in said gas mixture flow stream upstream from said respective adsorber chambers.

6. An apparatus for composition modulation of a complex gaseous mixture in a flow stream thereof, comprising a conduit system adapted to convey said flow stream, said conduit system including a manifold inlet portion and first and second branch portions communicating with said inlet portion; first and second adsorber chambers defined respectively in said first and second conduit system branch portions; each said chamber having an inlet and an outlet and adapted to contain a body of an adsorptive material intermediate the inlet and outlet of each said chamber, said material being adsorptive for at least one component of said complex gaseous mixture; means in said conduit system manifold inlet portion adapted to produce a substantially constant and selected reduced pressure in a stream portion downstream from said means; valve means in each of said first and second conduit systems branch portion, each having an inlet portion in open communication with one of said branch portions upstream from the adsorber chamber defined therein, a first outlet port connected for communication with said adsorber chamber inlet, and a second outlet port; a pair of conduit cross connections each connected at one end in open exclusive communication with an inlet of one of said adsorber chambers and at the other end connected for exclusive communication with said second outlet port of the valve means in the branch portion defining said other adsorber chamber; means adapted synchronously to actuate each of said valve means repetitively and alternately to connect each branch portion with each adsorber chamber for a cycle period substantially equal in time to that required for said adsorbent material therein to reach an equilibrium capacity for said mixture component at each of said initial and reduced pressures; whereby the content of said component in the stream portion discharged by each adsorber chamber outlet is decreased by adsorption on said contained adsorbent material at said initial pressure and increased by desorption from said adsorbent material at said reduced pressure; valve means in each outlet from each of said first and second adsorber chambers, each said valve means having an outlet port, a first inlet port connected for communication with said adsorber chamber outlet in which said valve is disposed and a second inlet port; a pair of conduit cross connections, each connected in exclusive open communication with an outlet from one of said adsorber chambers and connected at the other end thereof with said inlet port of said valve means in the outlet of said other adsorber chamber; means adapted synchronously to actuate each of said valve means in each adsorber chamber to connect each outlet alternately in repetitive sequence with the first inlet port of said valve means in said adsorber chamber outlet and second inlet port of said valve means in the outlet of said other adsorber chamber for cycle periods substantially equal to those of said actuating means for said valve means in said conduit system branch portions upstream from said adsorber chambers; and means for maintaining a substantially constant temperature in said gas mixture flow stream from said respective adsorber chamber.

References Cited in the file of this patent

UNITED STATES PATENTS

| | | |
|---|---|---|
| 1,934,075 | Lewis | Nov. 7, 1933 |
| 2,000,119 | Brown et al. | May 7, 1935 |
| 2,444,613 | McCombie et al. | July 6, 1948 |
| 2,508,238 | Fagen | May 16, 1950 |
| 2,579,352 | White | Dec. 18, 1951 |

OTHER REFERENCES

Thorpe et al.: "Thorpe's Dictionary of Applied Chemistry," vol. 1, Longmans, Green and Co., New York (1937), page 150.

Mantell: "Adsorption," McGraw-Hill Book Co., New York (1945), pages 19–20.